United States Patent [19]

Brophy et al.

[11] Patent Number: 5,429,506
[45] Date of Patent: Jul. 4, 1995

[54] METHOD OF COMPUTERIZED ADMINISTRATION OF A LIFE INSURANCE PLAN USING COMPUTERIZED ADMINISTRATION SUPERVISORY SYSTEM

[75] Inventors: John T. Brophy, Weston, Conn.; Arthur C. Eddy, Norcross, Ga.; V. Ann Lyndon, Stamford, Conn.

[73] Assignee: Westport Management Services, Inc., Westport, Conn.

[21] Appl. No.: 41,590

[22] Filed: Apr. 5, 1993

[51] Int. Cl.⁶ ............................................. G09B 19/18
[52] U.S. Cl. ................................................. 434/107
[58] Field of Search ................ 434/107; 364/401, 406, 364/408

[56] References Cited

U.S. PATENT DOCUMENTS

| | | | |
|---|---|---|---|
| 2,382,007 | 8/1945 | Frick | 434/107 X |
| 2,925,668 | 2/1960 | Forest | 434/107 |
| 3,186,323 | 6/1965 | Niehaus | 434/107 X |
| 3,406,467 | 10/1966 | Davis | 434/107 |
| 3,634,669 | 1/1971 | Soumas | 235/185 |
| 4,491,725 | 1/1985 | Pritchard | 235/375 |
| 4,831,526 | 5/1989 | Luchs et al. | 364/401 |
| 4,837,693 | 6/1989 | Schotz | 364/408 |
| 5,235,507 | 8/1993 | Sackler et al. | 364/401 |
| 5,241,466 | 8/1993 | Perry et al. | 364/401 |

Primary Examiner—Gene Mancene
Assistant Examiner—Jeffrey A. Smith
Attorney, Agent, or Firm—Merchant, Gould, Smith, Edell, Welter & Schmidt

[57] ABSTRACT

A system and method which links a premium paying corporate life insurance plan with a voluntary employee group life plan. The system and process manage a split of premiums of a single life insurance policy between an employer and an employee in such a way as to provide an employee with a designated death benefit but also to allow the employer to invest funds in the cash value of the single life insurance contract to fund the group life benefit.

11 Claims, 5 Drawing Sheets 5,429,506

1

METHOD OF COMPUTERIZED ADMINISTRATION OF A LIFE INSURANCE PLAN USING COMPUTERIZED ADMINISTRATION SUPERVISORY SYSTEM

FIELD OF THE INVENTION

The present invention is directed to a system and method for managing life insurance and, more particularly, to a system and method for managing combined split-dollar employer/corporate life insurance.

BACKGROUND OF THE INVENTION

A majority of corporations provide access to life insurance benefits for their employees. That benefit is typically provided through group term life insurance. In traditional group term plans, the employee designates the beneficiary of the contract. Depending on the plan design, the cost of this benefit may be subsidized by the employer.

Most employee welfare benefit plans that provide death benefits are funded in whole or in part by "experience-rated" group term life insurance. Under a typical experience-rated arrangement, the employer will pay a provisional premium to the insurer at the beginning of each policy period. When an employee dies, the insurance company pays a specified death benefit to the employee's beneficiary. If the total death benefits paid out in any given policy period are greater than the provisional amount paid by the employer, the employer must then pay the shortfall to the insurance company. Conversely, if the amount of benefits paid by the insurance company turns out to be less than the employer's provisional premium, the company refunds the excess to the employer.

The delivery of the benefit through experience-rated term life insurance arrangements creates a number of disadvantages from both the employer and the employee's perspectives. Such programs do not provide the employer with any protection against the risk that an unexpectedly large number of employees might die in any given policy period. In such an event, the employer is faced with the full financial burden of paying the employee death benefits.

In addition, under Internal Revenue Code, Section 79, which governs group term life insurance, the employee is faced with imputed income on any company-paid life insurance coverage in excess of $50,000. The amount of imputed income mandated by this Section is typically significantly higher than the actual cost of the coverage, resulting in additional taxation to the employee. At termination or retirement, the employee's only option with respect to maintaining his or her coverage is to convert the group term insurance policy to a whole life insurance policy which, in many instances, may cost 20 to 30 times more than the cost of the benefit while he or she was employed.

Consequently, in recent years employers have provided limited company paid group term life insurance benefits (typically limited to a maximum of $50,000 per employee) and have arranged for employees to purchase additional group term life insurance in amounts of some multiple of the individual's salary on a voluntary basis. Such additional voluntary insurance costs may be subsidized by the employer and the employer provides some administrative services and collects the employee's premiums through payroll deductions for the insurance company.

This conventional arrangement is illustrated in EMPLOYEE portion A of FIG. 1. As can be seen in FIG. 1, the employer 10 pays the voluntary group life premium 12, usually as a payroll deduction from the employee's net pay 11. The premiums 12 are held in a general account 14. Upon the death of an active employee 16, a group term death benefit 18 is paid out of the general account 14 directly to the employee's beneficiary.

Unrelatedly, employers have purchased permanent whole life insurance policies for the purpose of funding employee benefits and other expenses. Such policies are generally referred to as corporate owned life insurance (COLI) contracts. With such contracts, the employer is the owner/beneficiary and the employee is the insured. COLI contracts are usually comprised of a cash value or savings portion and a term death benefit portion. Because of the tax treatment of life insurance contracts, the COLI contracts are attractive investments which can provide funds for various deferred expenses of the employer.

This conventional arrangement is illustrated in EMPLOYER portion B of FIG. 1. The employer 10 pays a premium which is divided into the COLI cash value premium 20 and a COLI term premium 22. The COLI term premium 22 is deposited in the general account 14, but the COLI cash value premium 20 is deposited into a separate account 24. The insurer 26 separately manages the general account 14 and the separate account 24. Upon the death of an employee, the COLI term portion of the death benefit 28 is paid out from the general account 14 to the employer, while the COLI cash value portion of the death benefit 30 is paid out of the separate account to the employer. The benefits 30 are used to fund the employee benefits and other expenses 19.

A number of major potential problems exists with the use of COLI contracts including the question of an employer's insurable interest in a broad base (large numbers) of employees, the selection of the proper amount of insurance for each insured employee, concern over whether to disclose the existence of such insurance to the employee, the potential for a claim from an employee's estate or beneficiaries for some or all of the death benefits, and the like.

Because of the problems associated with existing experience-rated group term and COLI products, many employers have expressed interest in alternative life insurance arrangements, that limit the risks to which employers are exposed and at the same time minimize the adverse tax consequences to employees and provide an attractive savings elements for employer funds. One such alternative that has been considered is a concept referred to as "split dollar insurance". This is an arrangement which takes a single life insurance policy issued on an individual policy basis and splits the premium and benefits between the employer and employee.

There are several major problems with traditional split dollar insurance. One is that it has been limited to only highly compensated employees. For ERISA purposes, most commentators are comfortable that you can rely on the top hat exemption for highly compensated employees, but for employees falling below that level, ERISA restrictions would apply. For a general discussion of these restrictions, see Richey et al., *Comprehensive Deferred Compensation,* National Underwriting Co., Chapter 5, pp. 29–38, 1989, and Jenkins et al, "ERISA Planning for COLI Financed Nonqualified Plans", *Journal of the American Society of CLU and ChFC*, pp. 24–36, January 1991.

With regard to employees that are not at the top level of the company, the question has been to what extent should the cash value of the policy be considered a plan asset for ERISA purposes. If the entire policy including the cash value was regarded as an asset of an employee benefit plan, then the employer's exercise of rights of ownership with respect to the policy could be viewed as prohibited transactions and in violation of ERISA. Another major problem has been the higher insurer expenses inherent in the pricing of individual life insurance policies.

Also, because of the nature of individual policies, termination of employment requires that the employer terminates its interest in the contract. The employee continues his or her interest only if he or she assumes the cost and tax consequences of the entire contract.

SUMMARY OF THE INVENTION

The present invention overcomes the drawbacks of conventional split dollar insurance contracts by providing a competitive group term life insurance component and a competitive cash value component. The combination of this contract with an unique system which manages the distinct dual ownership of the contract permits the employee and employer to go their separate ways without altering either's interest in the contract.

Although the contract comprises two components and is managed by the system as two separate and distinct components, in actuality it is a single contract which meets the requirements of state insurance laws and Internal Revenue Code, Sections 7702 and 7702a, defining a single contract. The employee/employer "partners" by formula simply share the benefits and costs on an equitable and actuarially sound basis.

The present invention manages the single life insurance contract with complete separation of the respective partner's interests so that the employee's premium payments are not used in any amount to subsidize the employer's values. Further, the invention manages the contract so that the investment performance of the separate cash value account does not in any way diminish the employees insurance coverage or increase its cost to the employee. Pursuant to Advisory Opinion 92-22A, dated Oct. 27, 1992, in response to applicants' request, the Department of Labor confirmed that such a system will result in the cash value component being excluded as a plan asset for ERISA purposes. In this way, the split dollar methodology may be used for all employees regardless of compensation level. This results is a more economical and effective system for and method of providing for employees to continue coverage after separation from the corporation.

Employers implementing the present invention purchase permanent life insurance on the life of each employee. It is noted that the invention may provide for coverage on a large-scale basis, that is, for as few as a hundred employees or up to many thousands of employees.

In exchange for the employee's participation in the plan, the policy-owner (employer) agrees to endorse to the employee the right to choose the face amount of the policy and the right to name the beneficiary of the policy for that chosen face amount. The employee may or may not pay part of the premium depending on the plan provisions. The endorsement also provides the employee with the right to continue the coverage upon termination from the company by paying the appropriate term insurance premium. The rights of the employee (insured) are independent of any actions taken by the employer with respect to the exercise of any employer ownership rights.

As discussed above, the invention manages this unique contract as a single integrated contract for insurer purposes and provides the necessary support to interface the insurer's premium billing with the employer's payroll system in order to deduct the employee's share of the total premium from the employee's pay. For participating separated and retired former employees, the system provides for direct billing to the employee to make the employee's term benefits portable. Also, since the employer may use the cash value portion of the insurance plan, the employer may elect to fund benefits for retired employees.

DETAILED DESCRIPTION OF THE PREFERRED EMBODIMENTS

Figure 1:
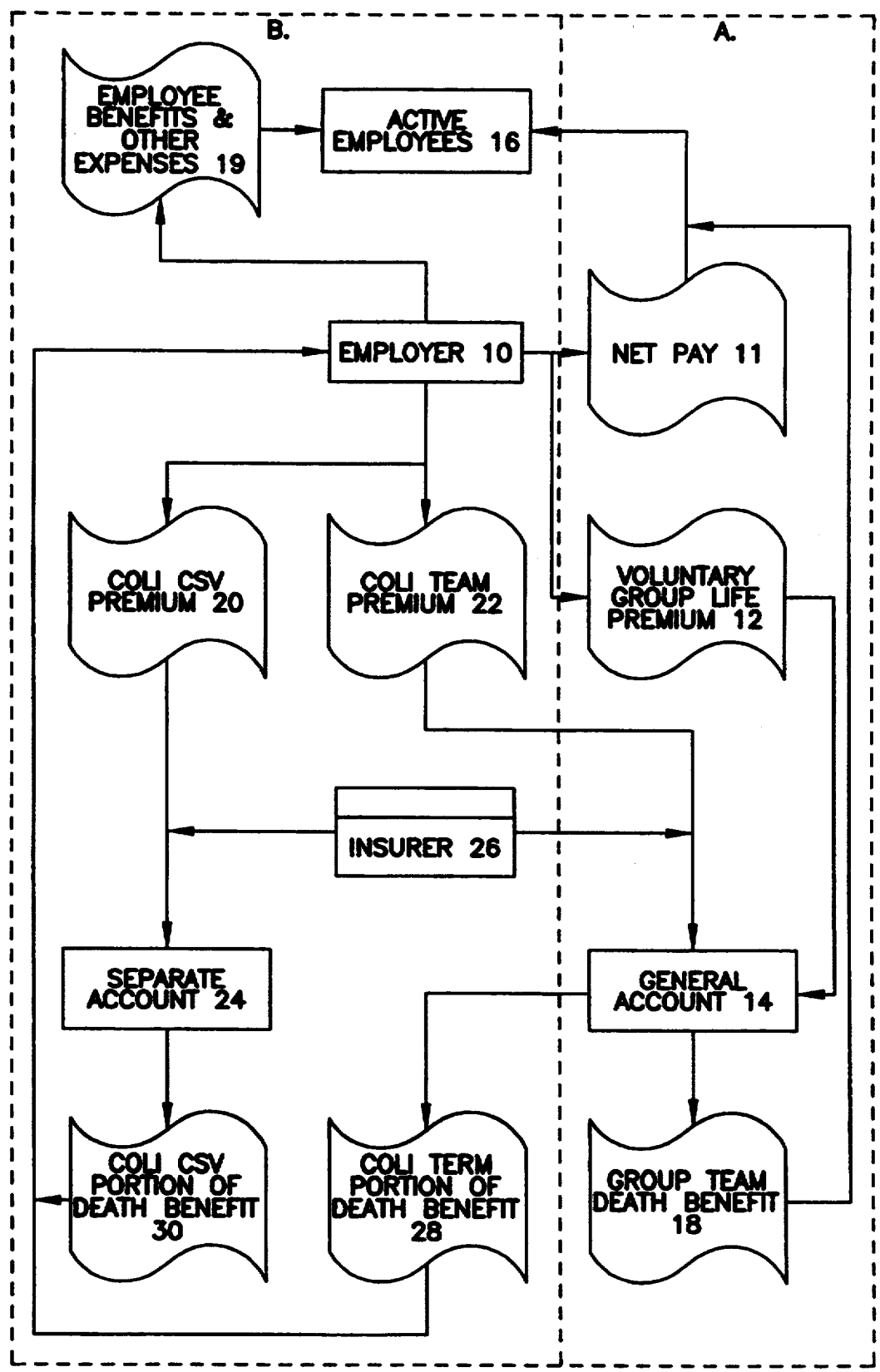
FIG. 1 is a flow chart generally depicting the cash/benefit flow of a conventional group term and COLI life insurance plan.
Figure 2:
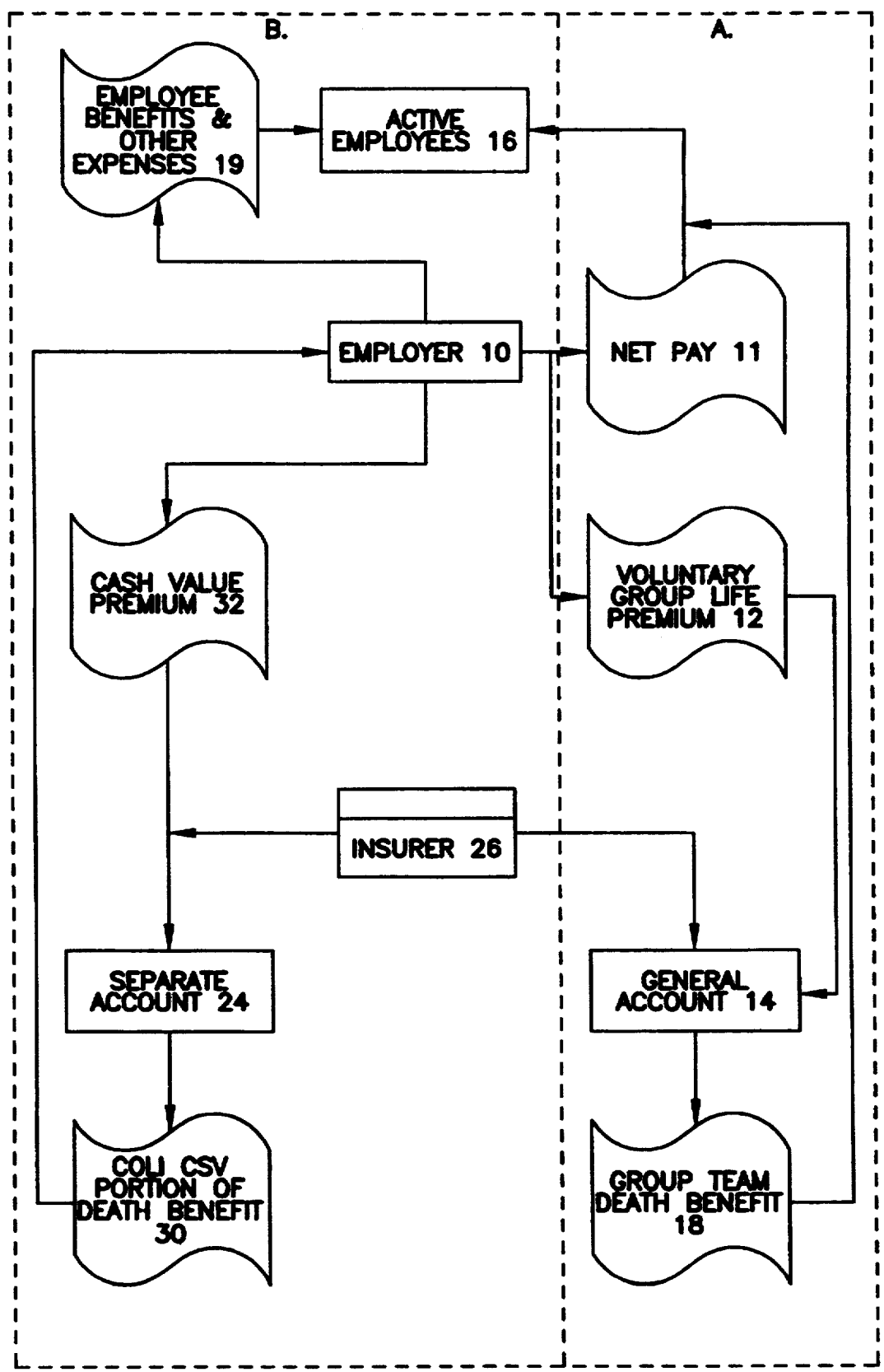
FIG. 2 is a flow chart generally depicting the cash/benefit flow of a split-dollar life insurance plan according a preferred embodiment of the present invention.

FIG. 2 generally depicts the cash/benefit flow according to a preferred embodiment of the system and method of the present invention. Throughout the Figures, like numerals are used to designate like elements. Also, throughout this description, reference is usually made to a single employee. However, it is to be understood that the present invention may be used to provide insurance for any company employee, regardless of the employee's level of compensation.

FIG. 2 shows the invention conceptually divided into employee portion A and employer portion B. As in conventional systems, employer 10 pays a voluntary group life premium 12 into general account 14. This premium is preferably paid out as a payroll deduction, i.e., the employee is actually paying the premium 12 out of the net pay 11. Upon the death of the employee, the group term death benefit 18 is paid to the employee's beneficiaries. It should be noted that FIG. 2 shows the arrangement while the employee is in active employment. The arrangement which takes place once an employee is separated from the company is discussed below.

Employer 10 also pays a cash value premium 32 into a separate account 24. Importantly, the insurer 26 is responsible for plan administration and manages the general account 14 and the separate account 24 so as to safeguard the employee's interest. Upon the death of the employee, the cash value benefit 30 is paid to the employer 10, which can be used to fund employee benefits and other expenses 19, as the company sees fit.

Figure 3:
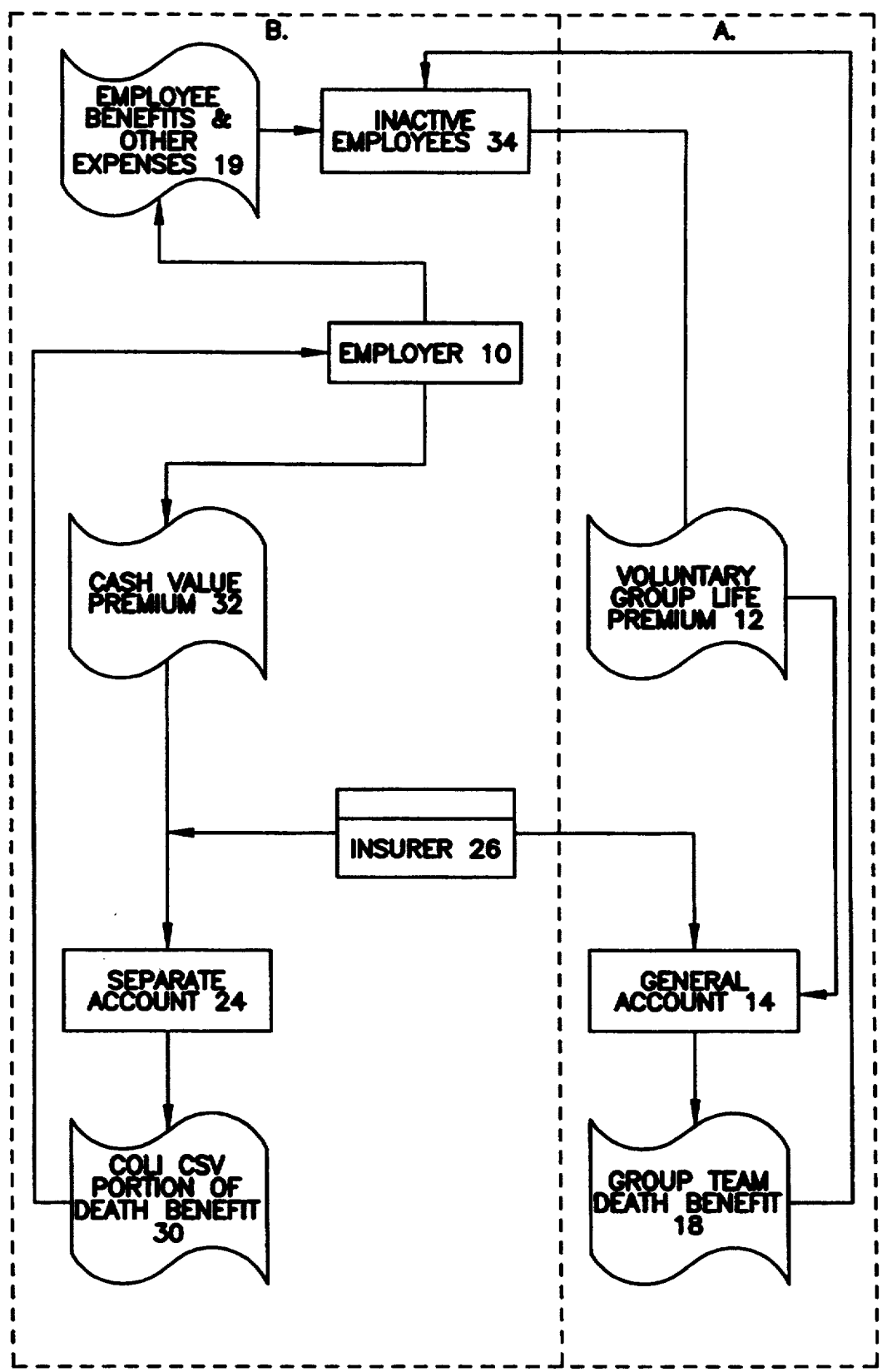
FIG. 3 is a flow chart generally depicting the cash/benefit flow of the plan according to FIG. 2 for an inactive employee with voluntary group term benefits maintained.

FIG. 3 shows the arrangement when the employee becomes an inactive employee 34, i.e., becomes separated from the company due to retirement, change of jobs, or the like, while electing to maintain the voluntary group term life plan. In this case, the cash/benefit flow is the same as in FIG. 2, except that the voluntary group life premium 12 is paid directly by the inactive employee 34, rather than through payroll deduction. Alternatively, it is envisioned that the employer may elect to continue to pay the voluntary group life premium 12 on behalf of the separated employee. Further, all or part of the premium 12 may be paid by the separated employee through the employer. In this way, the group term life benefit is entirely portable for the employee, and need not be extinguished upon the employee's separation from the company.

Figure 4:
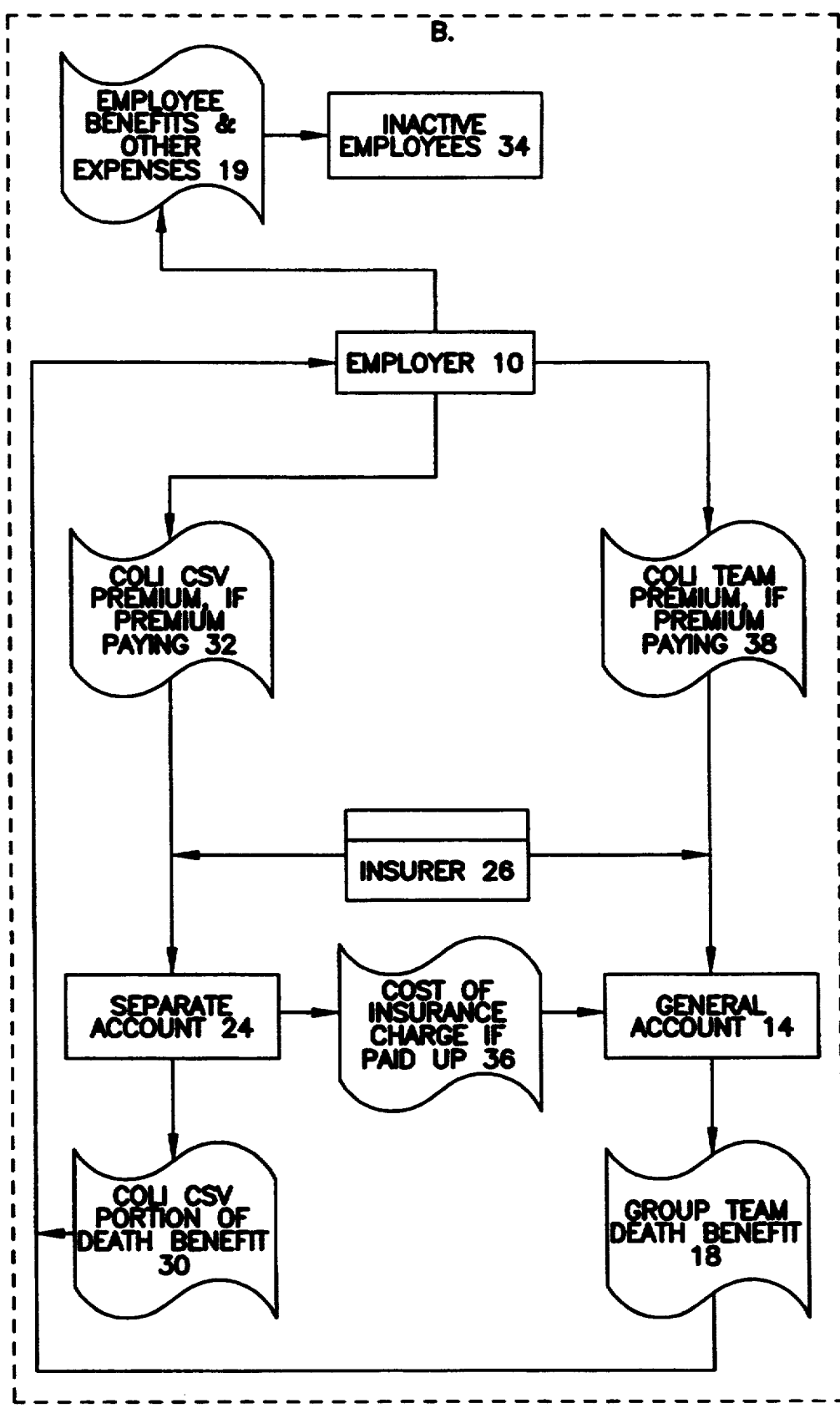
FIG. 4 is a flow chart generally depicting the cash/benefit flow of the plan according to FIG. 2 for an inactive employee with voluntary group term benefits not maintained.

FIG. 4 shows the arrangement when the employee becomes inactive, but does not elect to maintain the group life term benefit. In this case, the employer 10 may elect to pay a corporate term premium 38 in lieu of the employee's previous voluntary group term premium 12. In such case, the corporate term premium 38 is paid into the general account, and upon the death of the employee, the group term death benefit 18 is paid to the employer 10 instead of the employee. Additionally, if the employer 10 elects the paidup insurance option, the cost of insurance charge 36, in lieu of the term premium 38, is transferred from separate account 24 to general account 14.

Figure 5:
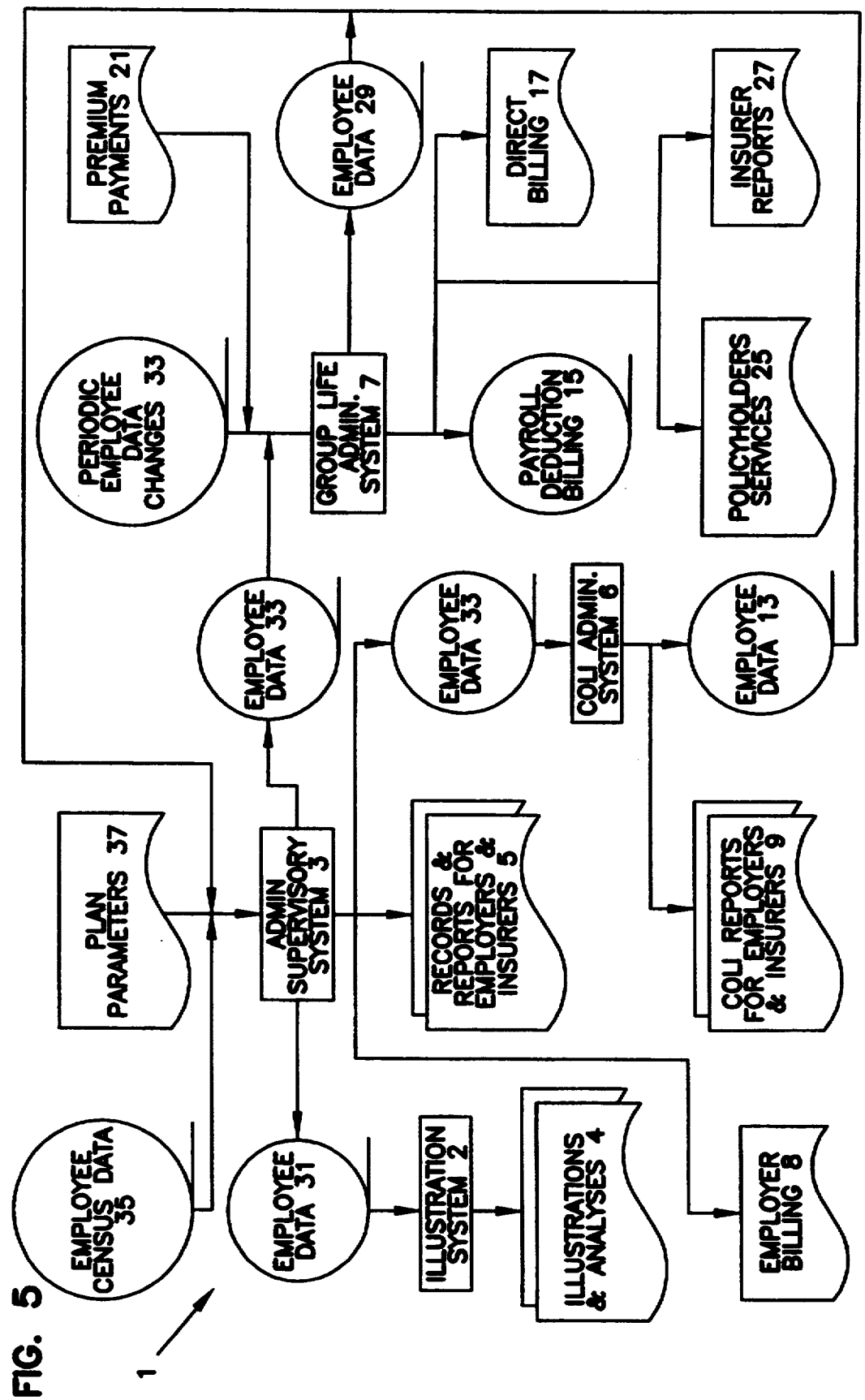
FIG. 5 is a flow chart generally depicting a preferred implementation of the present invention as shown in FIGS. 2–4.

A preferred embodiment of the implementation of the invention is shown in FIG. 5. As shown in FIG. 5, a Partnership Life Express Design and Generation Engine ("PLEDGE") system 1 facilitates analysis of the existing insured group(s) and extrapolation of the optimal prototype for the plan. The PLEDGE system 1 provides for the refinement of the prototype from the initial theoretical group to the final actual enrolled group of participants. The PLEDGE system 1 includes an illustration subsystem ("PLEXIS") 2 and a combined employer and ERISA plan administration supervisory system ("PLUS") 3.

It is envisioned that the system 1 may incorporate toolbox programs by Crescent Software, Inc. of West Redding, Conn., for example, which may be used in the illustration subsystem 2. It is noted that the associated spreadsheet programs use the programs "Excel" by Microsoft Corp. and "Quattro Pro" by Borland International, Inc. of Scotts Valley, Calif.

Various toolbox programs, such as screen painters and user interface development programs, for example, may be incorporated into administration supervisory system 3. It is noted that any microcomputer implementation of PLUS must be network ready and able to run under Microsoft "Windows". In implementing PLUS, it may be advantageous to use the "Borland Paradox Engine" by Borland International, Inc. to provide a database framework appropriate for integrating traditional programming applications with relational databases. The "Crystal Reports" reporting software by Crystal Computer Services, Inc. may be used in conjunction with the Paradox Engine.

Illustration subsystem 2 includes an underlying plan projection system ("ALPS") and a group of associated spreadsheet programs which produce various illustrations and analyses 4 which are developed from employee data 31 provided by the administration supervisory system 3. ALPS develops illustrative policy values and basic cash flows, assets and liabilities for the employer and ERISA plan assets including, for example, claims stabilization reserves and experience refunds. The associated spreadsheet programs provide analysis of the existing group life and group universal life programs and demonstrate the impact of the plan on both the employer and the employee. ALPS is capable of evaluating the plan under a variety of input parameters including, for example, combinations of borrowing, loan payback and partial withdrawals (employer assets and liabilities) and employer subsidies (ERISA plan assets and liabilities). It provides the data for insurer profitability tests and sample accounting entries for both the insurer and the employer, and outputs this data to associated spreadsheet programs which provide illustrations and analyses 4.

Administration supervisory system 3 maintains an ERISA plan record for each participant, created from employee census data 35 and plan parameters 37, which tracks the participant's coverage and plan contributions, if any. Administration supervisory system 3 generates employer and insurer summary records 5 describing the plan design, including the employer's plan subsidy, if any, and recording the employer's contributions to the plan. The record includes such information as is needed to generate the employee records 33 which are required by the cash value administration subsystem 6 and by the group life administration subsystem ("GLAS") 7. Administration supervisory system 3 also creates the employer's annual premium billing 8 incorporating premiums for both the cash value and non-cash value portions of the policies.

It is noted that experience-rated insurance plans allow one to pay certain premiums into the plan and, if the claims made under the plan are less than expected, subsequent premiums are lowered or a refund is paid out to the plan participants, and alternatively, if the claims made under the plan are greater than expected, subsequent premiums are raised. Administration supervisory system 3 therefore must be able to carefully account for what premiums were paid by whom, so that any credits or amounts due may be assigned correctly. For example, since term premiums may be paid by either the employee alone, the employer alone, or the employee and employer in combination, the administration supervisory system 3 must be able to manage and account for these premiums carefully, and in such a way that all benefit accrues to the employee so that there is no violation of ERISA.

System 3 must be able to provide correct accounting entries for both the insurer and employer. From the insurer's point of view, this includes providing a correct accounting of the term premiums, experienced-rating adjustments and death benefits involving general account 14, and cash value premiums, loans and withdrawals and the like involving separate account 24. Thus the insurer's accounting looks at every dollar paid into either separate account 24 or general account 14 and what happened to it. From the employer's perspective, this involves accounting for: (1) the optional cash value premiums paid for the employer's benefit (that he has the correct accounting entries to show what the assets and liabilities are under separate account 24), (2) any term insurance premiums subsidized by the employer and paid into general account 14, and (3) any term employee premiums prepaid by the employer on behalf of the employee, and reimbursed by the employee to the employer. From an ERISA perspective, the term premiums paid on behalf of the employee (regardless of who paid them) and the death benefits paid to the employee's beneficiaries must be properly accounted (the ERISA plan belongs to the employees, but the employer has a fiduciary responsibility to the ERISA plan). In a sense, the present invention is an amalgam of group term-type portions and cash value-type portions, with an overlap therebetween. The system 3 must be able to account for the overlap and not count the same monies twice.

Cash value administration subsystem 6 preferably includes applications software including toolbox material by Crescent Software. The toolbox material by Crescent Software provides a variety of utilities for programmers including, but not limited to, assembler language routines to improve performance and development tools such as screen painters. It is envisioned that ALPS may include such software as well.

Cash value administration subsystem 6 maintains the employer's benefit (cash value) records and reports 9. It also generates employee summary information 13 and outputs this information to the administration supervisory system 3.

Group life administration subsystem 7 maintains the employee's term insurance benefit records. The employee's periodic payroll deduction billing 15, or direct billing 17, are generated by subsystem 7. The employee's collected premiums 21 are fed back into administration supervisory system 3 for reconciliation. Group life administration subsystem 7 processes coverage changes 23 and supplies new coverage information 29 to the administration supervisory system 3. Group life administration subsystem 7 also provides policy holder services 25, such as beneficiary changes, address changes, customer inquiries, or the like, and produces insurer reports 27. Group life administration subsystem 7 also may provide services for the payment of death claims.

Group life administration system 7 may be implemented in a variety of ways. Insurers may elect to use existing in-house systems or third-party administrators' existing systems to perform the functions of the group life administration system. A combination of in-house and third-party systems, or a combination of third-party systems may be used. Any of these choices may involve certain modifications in order to report back to the administration supervisory system 3 the information needed for the plan, including a more precise accounting for employee contributions than many systems now provide. This accounting is required to determine the employer's cost basis in the plan and to comply with the Advisory Opinion from the Department of Labor discussed above. It is understood that implementing such modifications is well within the ability of one skilled in the art.

Any suitable hardware sufficient for running the above programs may be used. One preferred embodiment includes an 80–486 microcomputer having 16 MB of Ram, as well as 200 MB fixed and 630 MB removable hard drives, for running the illustration subsystem 2 and the administration supervisory system 3. Another preferred embodiment includes a 80–486 color notebook computer with 8 MB of RAM and a 120 MB hard drive for running the illustration subsystem 2, thus making subsystem 2 portable. The group life administration system 7 also may be based on any suitable hardware, including microcomputers, a main frame based system, supercomputers, or the like.

The above is for illustrative purposes only. Modification can be made within the scope of the invention as defined by the appended claims.

We claim:

1. A method of computerized administration of a life insurance plan using a computerized administration supervisory system so as to provide split-dollar life insurance having an employee group term portion and a corporate cash value portion in a single policy, said method comprising the steps of:
   collecting group term premiums corresponding to amounts of death benefit elected by each employee participating in the plan;
   using the computerized administration supervisory system to allocate the group term premiums corresponding to the amount of death benefit for each employee to an accounting entry corresponding to each employee;
   collecting optional premiums from the corporation corresponding to cash value amounts for each employee participating in the plan;
   using the computerized administration supervisory system to allocate the optional premiums corresponding to the cash value amounts for each employee to an accounting entry corresponding to each employee; and
   using the computerized administration supervisory system to supervise funding the death benefits with said term and optional premiums.

2. A method as in claim 1, wherein said term premiums are solely funded by the employee.

3. A method as in claim 1, wherein said term premiums are solely funded by the employer.

4. A method as in claim 1, wherein said term premiums are funded by both the employees and employer.

5. A method as in claim 1, further comprising the step of maintaining the insurance plan in force for each employee should the employer elect to terminate the employer's participation in the plan.

6. A method as in claim 1, further comprising the step of maintaining the insurance plan in force for the employer should any one of the employees elect to terminate their participation in the plan.

7. A method as in claim 1, further comprising the step of altering the employer's participation in the plan forced by economic or tax law changes without disrupting or changing any employee's death benefits.

8. A method as in claim 7, wherein the employee's death benefits are not disrupted or changed even if the employer's participation in the plan ceases.

9. A method as in claim 1, wherein said plan administration supervisory system includes an illustration subsystem, a group life administration subsystem and a cash value administration subsystem.

10. A method as in claim 1, wherein said plan administration supervisory system administers the plan so as to comply with ERISA pursuant to the Department of Labor Advisory Opinion 92-22A.

11. A method as in claim 1, wherein the employer may utilize the cash value amounts without affecting the death benefits of any of the employees participating in the plan.

* * * * *